T. A. BENNETT.
CONVEYER BELT.
APPLICATION FILED JUNE 18, 1910.
1,050,603.
Patented Jan. 14, 1913.
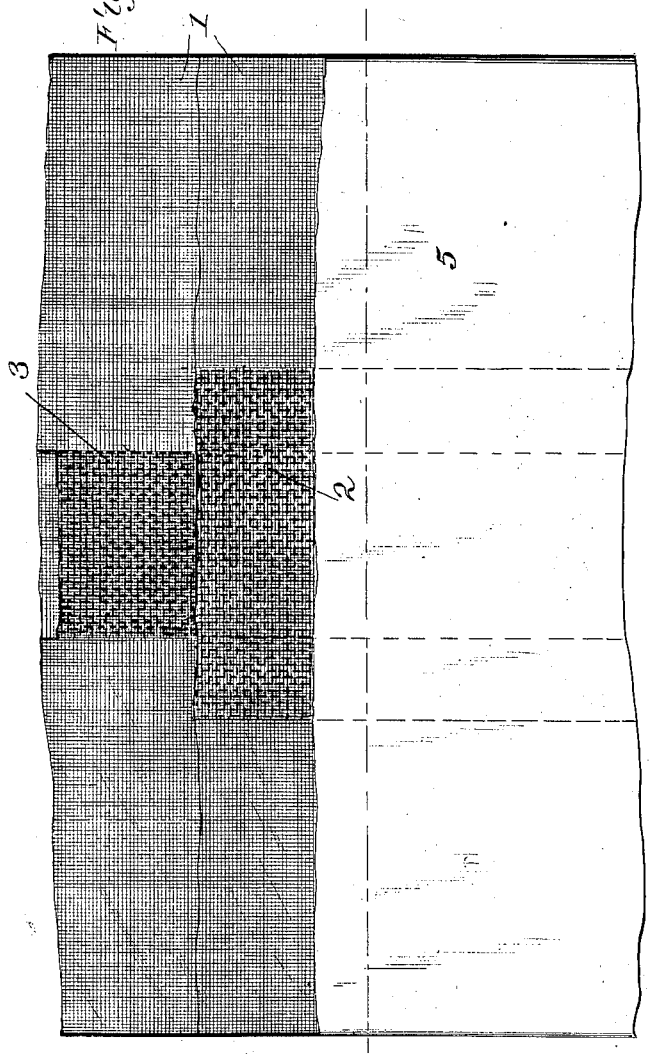
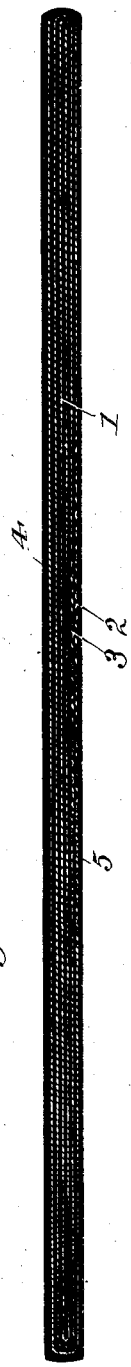
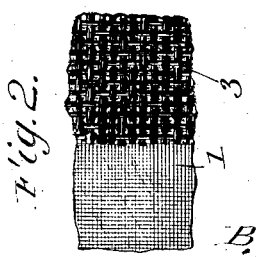
Witnesses:
C. H. Rueder
R. E. Newhall
Inventor:
Thomas A. Bennett
By Dodge and Sons,
Attorneys

UNITED STATES PATENT OFFICE.

THOMAS A. BENNETT, OF AKRON, OHIO, ASSIGNOR, BY MESNE ASSIGNMENTS, TO THE B. F. GOODRICH COMPANY, A CORPORATION OF NEW YORK.

CONVEYER-BELT.

1,050,603.      Specification of Letters Patent.      Patented Jan. 14, 1913.

Application filed June 18, 1910. Serial No. 567,593.

*To all whom it may concern:*

Be it known that I, THOMAS A. BENNETT, a citizen of the United States, residing at Akron, in the county of Summit and State of Ohio, have invented certain new and useful Improvements in Conveyer-Belts, of which the following is a specification.

My present invention pertains to conveyer belts, the construction and advantages of which will be hereinafter set forth, reference being had to the annexed drawings, wherein:

Figure 1 is a bottom plan view of a section of the belt various portions being broken away to show the several component parts and their relation to one another. Fig. 2 an enlarged detail view of a portion of the belt; and Fig. 3 a transverse sectional view of the belt, the scale being somewhat enlarged over that illustrated in Fig. 1.

The belt is designed for use in conjunction with a series of idler pulleys or wheels, over which it travels, at least, throughout a portion of its length, which, as is well understood, troughs the belt.

To permit the belt to assume its proper position or form while in use, various ways have been devised to render the belt sufficiently flexible, and the object of the present invention is to produce a belt which, while having the requisite flexibility, will be strong and durable and of uniform or substantially uniform strength throughout. Moreover, the fabric or body of the belt forming the basis of the present invention is of uniform thickness throughout.

The main body of the belt comprises a plurality of plies of canvas, duck or the like 1, which extend from edge to edge of the fabric, except that, in one or more of the layers, the middle portion is broken away or omitted during the building-up of the belt. In the accompanying illustration of one form of my invention, I have shown the two lower layers or plies as being treated in this way, but a greater or less number of the layers may be so treated and such layers may be elsewhere than in or near the bottom of the belt and still form a structure embodying my invention. The space left or formed in the outermost of any such layers or plies is, preferably, wider than the space in the next succeeding ply and such spaces are filled in by strips 2 and 3, respectively, of some highly flexible fabric, such as an open-mesh, loosely-woven fabric, the threads of which are soft as compared with those of the duck or canvas plies 1. The various plies and the flexible inserts are treated with rubber and the wearing surface 4 of the belt and the lower face 5, both composed of rubber, are all vulcanized or cured into one homogeneous structure. A belt constructed in this manner is found to insure sufficient flexibility along the longitudinal medial line thereof, while at the same time the body is very strong and the belt is admirably adapted for the work and to withstand the wear to which it is subjected. It will be further noted that the belt presents a smooth rubber surface throughout.

Having thus described my invention, what I claim is:

1. A conveyer-belt having a flexible insert or section extending longitudinally of the belt along its medial line, said insert being located entirely below the center of the belt and adjacent to the under face thereof.

2. A conveyer-belt comprising a body portion of uniform thickness throughout and having a fibrous section arranged along the medial line of the belt and extending longitudinally thereof; said section being relatively flexible as compared to the remainder of the belt and located entirely below the center of the belt adjacent to the under face thereof.

3. A conveyer-belt consisting of a plurality of plies of canvas and a highly flexible insert extending longitudinally thereof along its center line and of a width materially less than that of the belt, said insert being located below the center of the belt; and a rubber covering for the belt, the covering being vulcanized and producing an integral structure.

In testimony whereof I have signed my name to this specification in the presence of two subscribing witnesses.

THOMAS A. BENNETT.

Witnesses:
   CLAUDE FOUSE,
   H. E. HOERTZ.